Figure 1:
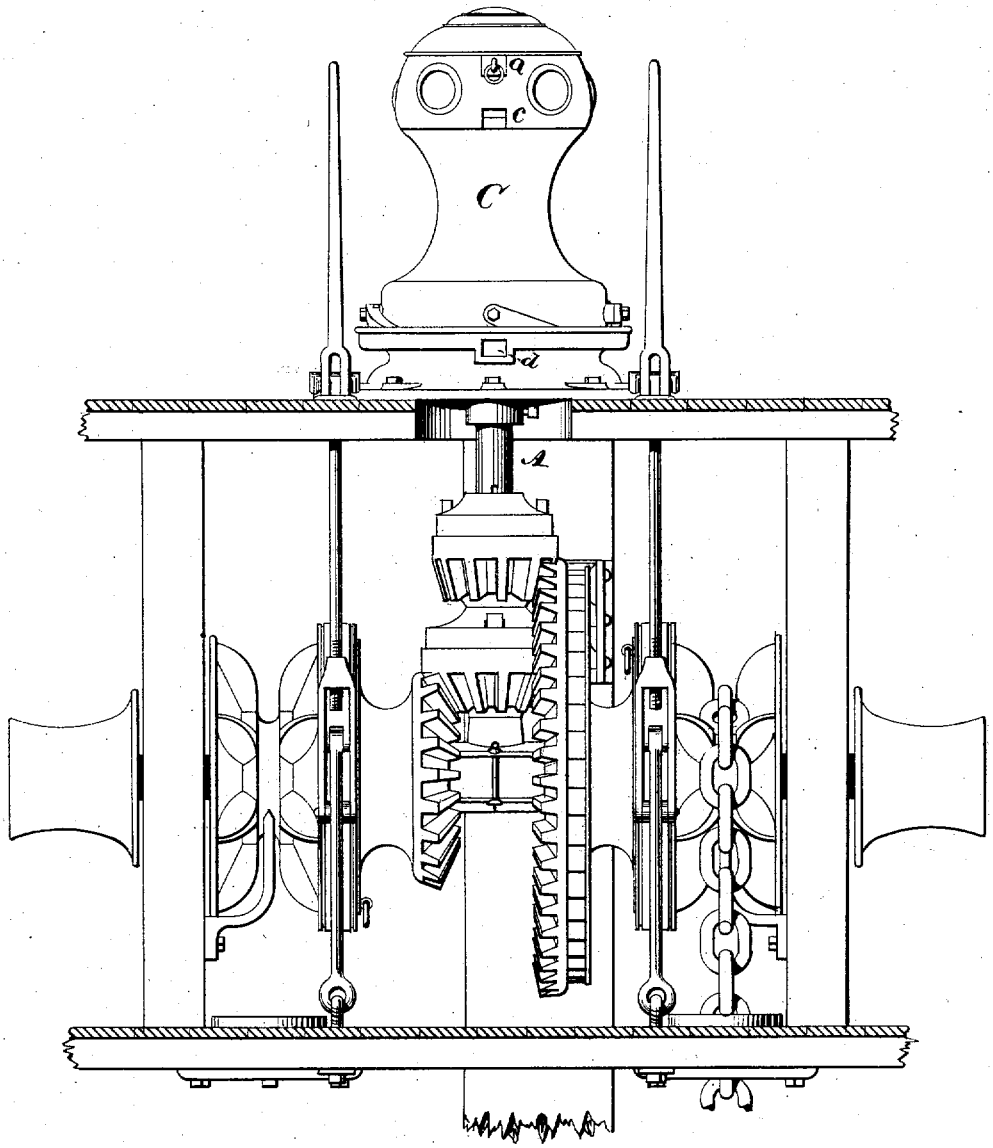

3 Sheets—Sheet 1.

J. P. MANTON.

Assignor to the AMERICAN SHIP WINDLASS CO.

Windlass.

No. 8,303. Reissued June 25, 1878.

Fig. I.

WITNESSES:

Joseph A. Miller Jr.

William L. Cox

INVENTOR:

Joseph P. Manton by Joseph A. Miller

Attorney

N. PETERS, PHOTO-LITHOGRAPHER, WASHINGTON, D. C.

J. P. MANTON.
Assignor to the AMERICAN SHIP WINDLASS CO.
Windlass.
No. 8,303. Reissued June 25, 1878.
Fig. 2.
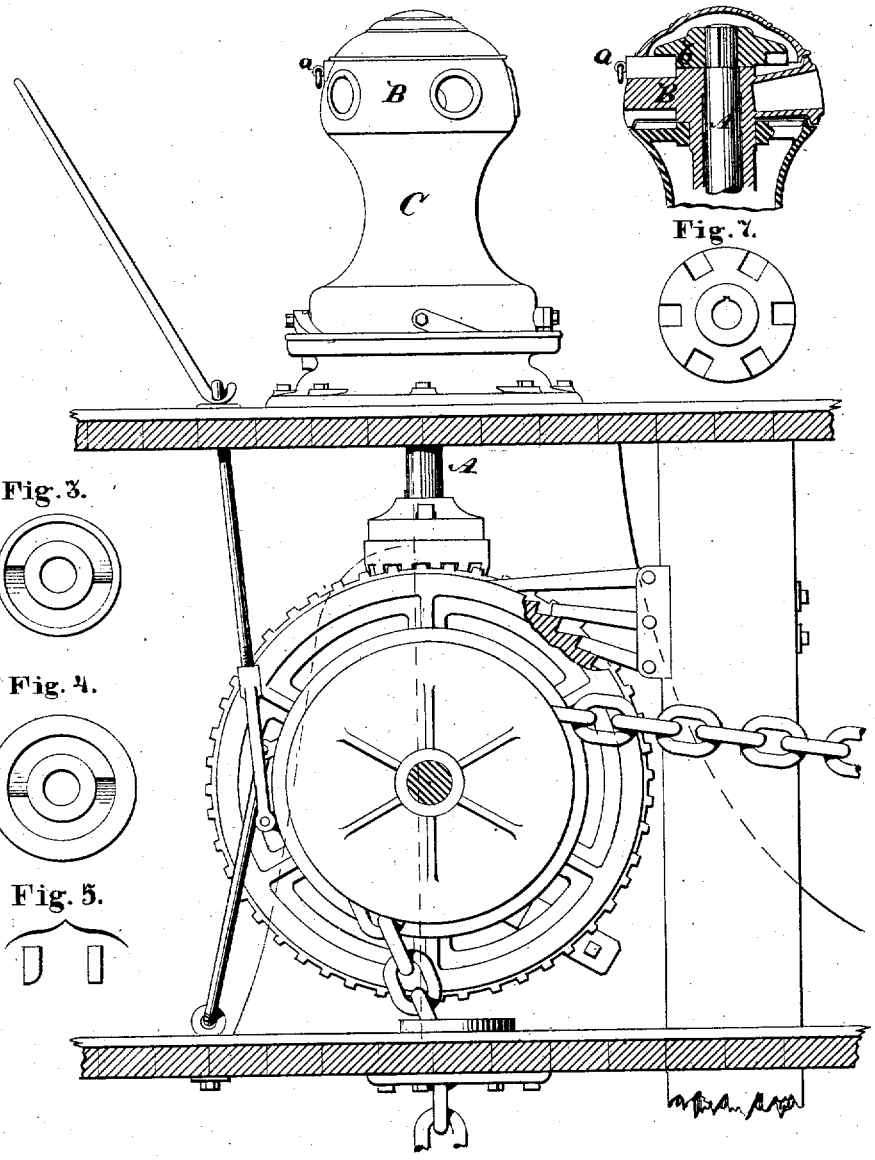
Fig. 6.
Fig. 7.
Fig. 3.
Fig. 4.
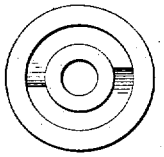
Fig. 5.
WITNESSES:
Joseph A. Miller Jr.
William L. Cox
INVENTOR:
Joseph P. Manton
by Joseph A. Miller
Attorney
N. PETERS, PHOTO-LITHOGRAPHER, WASHINGTON, D. C.

J. P. MANTON.
Assignor to the AMERICAN SHIP WINDLASS CO.
Windlass.
No. 8,303. Reissued June 25, 1878.
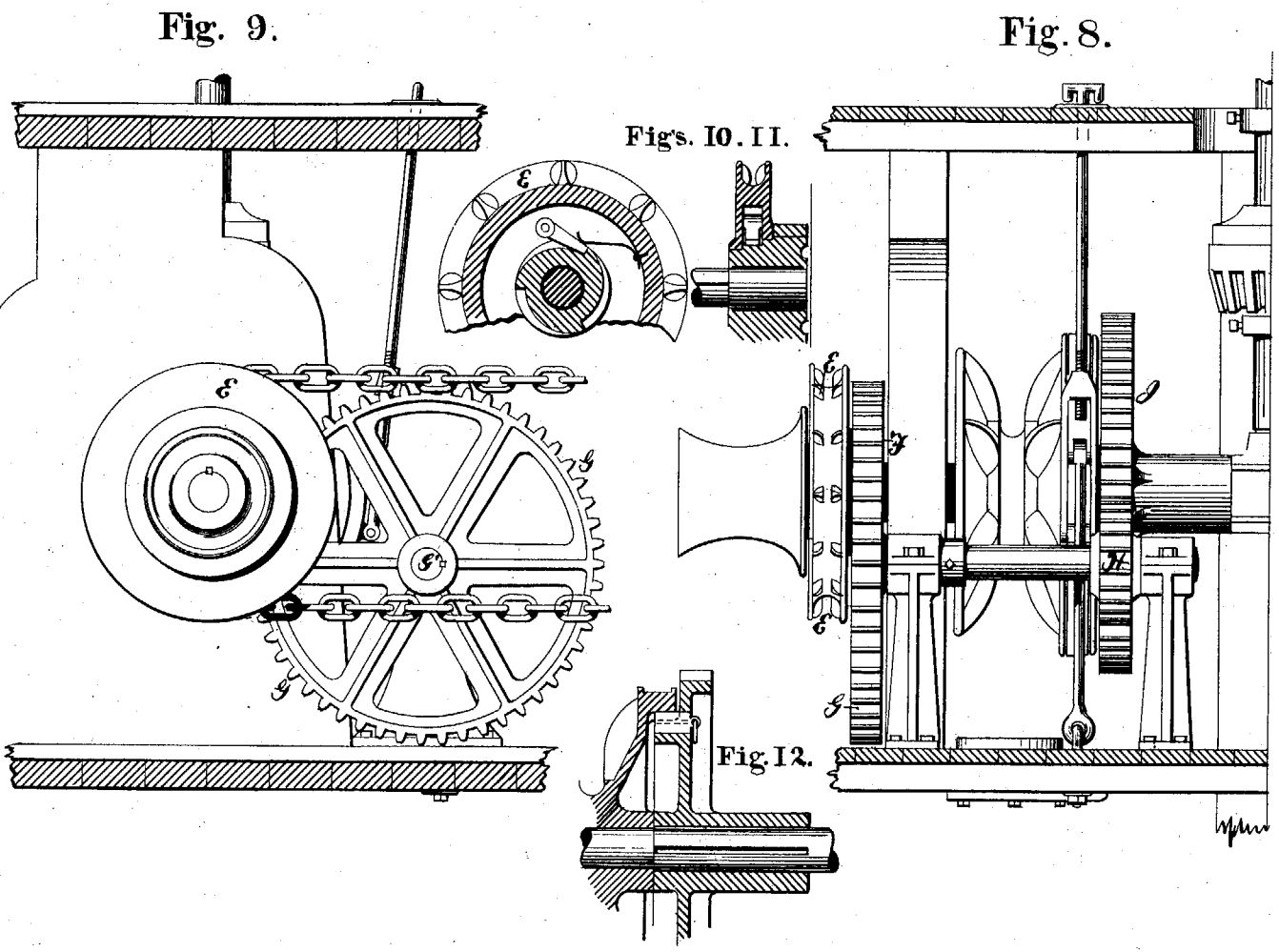
WITNESSES:
Joseph A. Miller Jr.
William L. Cope
INVENTOR:
Joseph P. Manton
by Joseph A. Miller
Attorney
N. PETERS, PHOTO-LITHOGRAPHER, WASHINGTON, D. C.

UNITED STATES PATENT OFFICE.

JOSEPH P. MANTON, OF PROVIDENCE, RHODE ISLAND, ASSIGNOR TO THE AMERICAN SHIP WINDLASS COMPANY, OF SAME PLACE.

IMPROVEMENT IN WINDLASSES.

Specification forming part of Letters Patent No. 176,331, dated April 18, 1876; Reissue No. 8,303, dated June 25, 1878; application filed May 4, 1878.

*To all whom it may concern:*

Be it known that I, JOSEPH P. MANTON, of the city and county of Providence, and State of Rhode Island, have invented certain new and useful Improvements in Windlasses; and I do hereby declare that the following specification, taken in connection with the drawings, making part of the same, is a full, clear, and exact description thereof, which will enable others versed in the art to which it appertains to make and use the same.

This invention has reference to improvements in ship-windlasses; and consists in the peculiar and novel arrangement by which a capstan provided with a single capstan-head is arranged so that it can be worked as a capstan and connected to or disconnected from the windlass, and one or both driven by the capstan-bars without removing the same; and also the novel means by which the windlass and the capstan can be driven, one or both, by steam-power through a messenger-wheel, as will be more fully set forth hereinafter, and pointed out in the claims.

Figure 1 is a view showing a capstan provided with one capstan-head and a windlass connected, so that one or both can be driven by the capstan-bars. Fig. 2 is a side view of the same capstan and windlass, partially in section, to show the ratchets. Fig. 3 is a top plan of the upper pinion-gear. Fig. 4 is a top plan of the lower pinion-gear. Fig. 5 represents the sliding key or dog for driving the pinions. Fig. 6 is a vertical section through the upper part of the capstan, showing the manner of locking the windlass-shaft to the capstan-head, and also the capstan-head to the windlass-barrel. Fig. 7 is an inverted plan of the windlass-head, showing the locking-sockets and key-seat, by which it is screwed to the central shaft. Fig. 8 is a partial view of a windlass driven by a messenger-chain and its connection with the central shaft of the capstan. Fig. 9 is an end elevation of the same, also showing the central shaft connecting the windlass with the capstan. Figs. 10 and 11 are vertical sections of the messenger-wheel and driving-pinion. Fig. 12 is a vertical section through the wild-cat and main gear, showing the manner of locking and unlocking the same.

Letters Patent for certain improvements in power-capstans were granted to Henthorn & Thayer, bearing date February 17, 1874, to the specification accompanying which I refer for a description of the capstan, shown at Figs. 1, 2, 6, and 7 of the present drawings, so far as it is adapted for use either as a simple or a power capstan.

The Emerson windlass (shown at Fig. 1 of the drawings) is, as is well known, arranged to be driven by a vertical driving-shaft, which admits of the windlass being located below the deck, but can be operated from the deck.

The present invention relates to certain modifications of the capstan described in the Letters Patent of Henthorn & Thayer above referred to; and consists in extending the shaft of the windlass through the hollow sleeve of the capstan and securing a locking or windlass head to said shaft, so that the capstan-head can be locked to the windlass-head and the windlass driven by the capstan-bars, and, when another key is placed to lock the capstan-barrel to the capstan-head, both the capstan and windlass can be driven by the capstan-bars; and when this last-mentioned key is removed and placed so as to connect the disk-plate F of the capstan with the base, the capstan-barrel will be driven with increased power, but at slower speed, and the windlass at the same time driven by the same capstan-bars, as long as the windlass-head is keyed to the driving-head of the capstan.

Without removing the capstan-bars the capstan can be driven as a plain capstan, as a power-capstan, and both with or without the windlass; and the windlass can be driven with or without the plain or power capstan, all being readily interchangeable by the use of two locking-keys.

In the drawings, A is the common shaft of the windlass and of the capstan. Upon the upper end of the said common shaft A, Fig. 6, a plate, *b*, is keyed. This plate *b* constitutes the windlass-head. This windlass-head can be combined with the capstan-head B at pleasure, or disconnected therefrom by the insertion or removal of a holding-key, *a*, and when the plate and head are so united the shaft A will be turned with the capstan-head, and movement will be given to the windlass.

By removing the key *a* from the upper seat for the same, and inserting it in the middle key-seat *c*, Fig. 1, the capstan-head becomes disconnected from the shaft A, but becomes locked with the capstan-band C, in which case the apparatus works as a simple capstan. By removing the key *a* from the seat *c* and inserting it in the lower seat *d*, a power-capstan is obtained, as described in the said Henthorn & Thayer patent.

It will thus be seen that by employing the driving-shaft of the windlass as the shaft for the capstan, and by arranging the capstan-head so that it can be locked thereto, I am enabled to work the windlass by the same capstan-head, which, when the key *a* is removed and inserted at *c* or at *d*, will work the capstan, but not the windlass.

I am aware that before my invention a power-capstan has been used to work a windlass.

I am also aware that a windlass has been worked by a simple capstan furnished with two separate heads, one of which was used to drive the capstan and the other the windlass; also, that a capstan-shaft and a windlass have been operatively connected at the windlass by means of a clutch, whereby the two might be disconnected; but I am not aware that before my invention a single capstan-head has been arranged so that it could be used at pleasure to work a capstan or a windlass by respectively locking the capstan-head to the capstan-barrel or to the capstan-shaft.

E, Figs. 8 and 9, is a messenger-wheel or chain-wheel, around which runs an endless chain, which is driven by the engine. The said messenger-wheel may be connected with a pawl-and-ratchet gear to its shaft, so that when the engine is running in the opposite direction from that in which it is required to run to drive the windlass, this wheel will turn loose on the shaft. It may also be arranged with a clutch, so that it may be connected with or disconnected from the windlass either at the engine or at the windlass.

On the same shaft with the messenger-wheel E is a spur-gear, F, Fig. 8, which engages with the wheel G, keyed on the shaft G′, and whose rotation carries the wheel H on the same shaft to drive the gear-wheel I on the windlass-shaft and give movement to the latter. The wheel H is connected to its shaft G′ by a spline, so that it can be disconnected from the wheel I at pleasure. Any other method to connect or disconnect this engine-power driving device may, however, be used.

By means of this messenger-wheel the windlass may be driven by steam-power, and, as the windlass-shaft extends upward through the capstan, both or either may be driven by steam, and also the capstan, through the compound gear, with increased power, so that by this arrangement both capstan and windlass may be driven, either through the capstan, by the capstan-bars, or the windlass, through the messenger-wheel, by the engine.

Having thus described my invention, I claim as new and desire to secure by Letters Patent—

1. The combination, with a windlass and capstan, of the windlass-head *b*, secured to the shaft A and arranged to be locked to the capstan-head, and the messenger-wheel E and intermediate gears, by which both the windlass and capstans may be driven by the capstan-bars or steam-power, substantially as described.

2. The combination, with the shaft A, connected with the windlass by gears, substantially as described, of the windlass-head *b*, the capstan-head B, provided with a sleeve surrounding the shaft and connecting the compound driving-pinion with the capstan-head, so that the capstan can be connected with the windlass and operated either as a simple or power capstan.

3. The combination, with a messenger-wheel and gears arranged to drive the horizontal shaft of a windlass, of the vertical shaft A, provided with a locking device, by which it is connected with the capstan, and gears connecting the horizontal with the vertical shaft, the whole arranged to drive the capstan through the windlass by steam-power.

4. The combination of the upright shaft and the windlass, the two directly geared together, and with the windlass-head keyed to said shaft, the power-capstan and a capstan head revolving around said shaft and arranged to interchangeably drive the capstan or the windlass, substantially as described.

JOSEPH P. MANTON.

Witnesses:
JOSEPH A. MILLER,
JOSEPH A. MILLER, Jr.